United States Patent [19]

Lee

[11] Patent Number: 4,834,485

[45] Date of Patent: May 30, 1989

[54] INTEGRATED FIBER OPTICS TRANSMITTER/RECEIVER DEVICE

[75] Inventor: Wai-Hon Lee, Cupertino, Calif.

[73] Assignee: Pencom International Corporation, Sunnyvale, Calif.

[21] Appl. No.: 140,351

[22] Filed: Jan. 14, 1988

[51] Int. Cl.⁴ .............................................. G02B 6/34
[52] U.S. Cl. ............................. 350/96.19; 350/96.16; 350/96.18; 350/162.2
[58] Field of Search ............... 350/96.15, 96.16, 96.17, 350/96.18, 96.19, 96.20, 3.7, 162.2; 250/227, 552; 357/17, 19, 30, 74, 80; 455/610, 612

[56] References Cited

U.S. PATENT DOCUMENTS 4,215,924  8/1980  Matsumoto .................. 350/96.19 X
4,412,720  11/1983  Costa ............................ 350/96.15 X
4,610,499  9/1986  Chern et al. ......................... 350/3.7

Primary Examiner—John D. Lee
Assistant Examiner—Phan T. Heartney
Attorney, Agent, or Firm—Townsend and Townsend

[57] ABSTRACT

An integrated transmitter/receiver system which uses a hybrid component for both the light source and the light detector, with holographic optical elements for dividing the light beam into two or more beams. The hybrid component contains a laser diode and a detector mounted on the same mechanical structure. This invention allows the placement of all the components substantially along a single optical axis. This arrangement reduces alignment problems and vibrational errors.

13 Claims, 2 Drawing Sheets

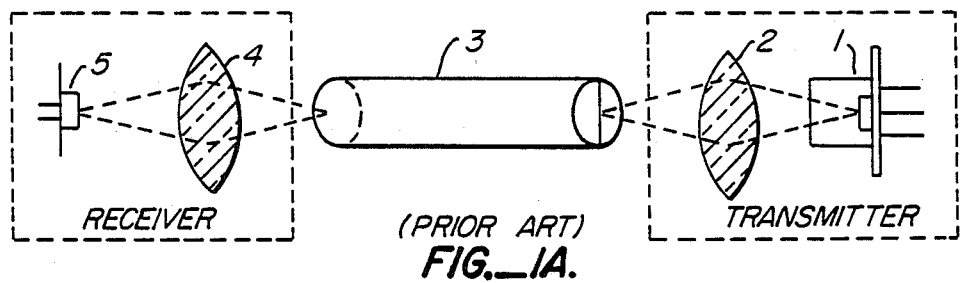
(PRIOR ART)
FIG._1A.
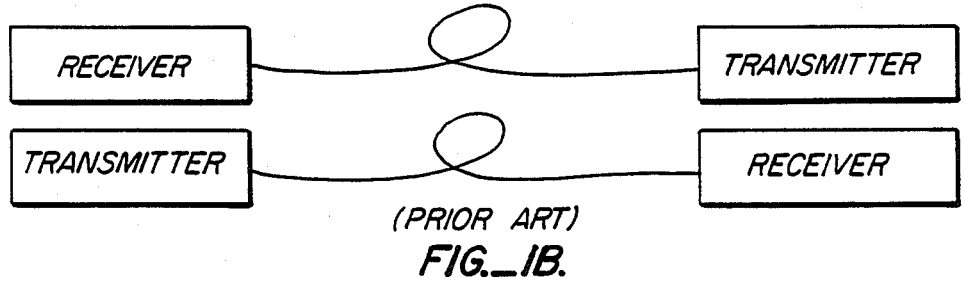
(PRIOR ART)
FIG._1B.
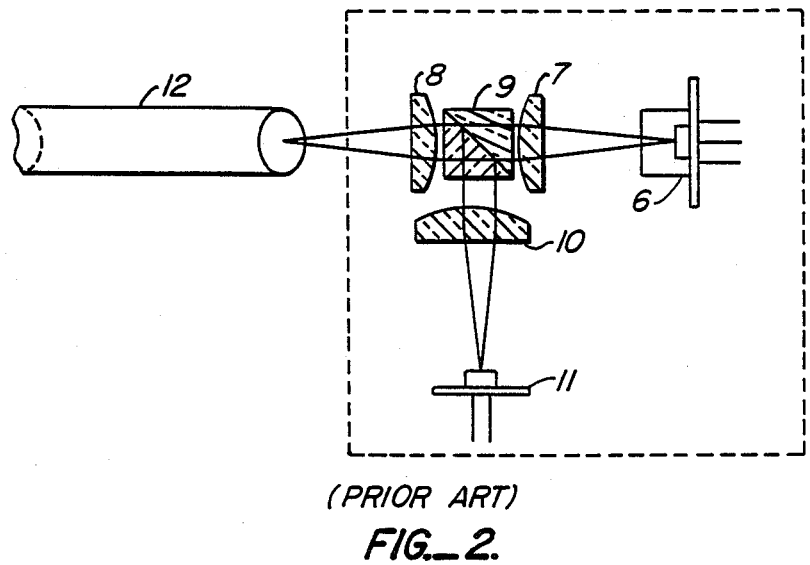
(PRIOR ART)
FIG._2.

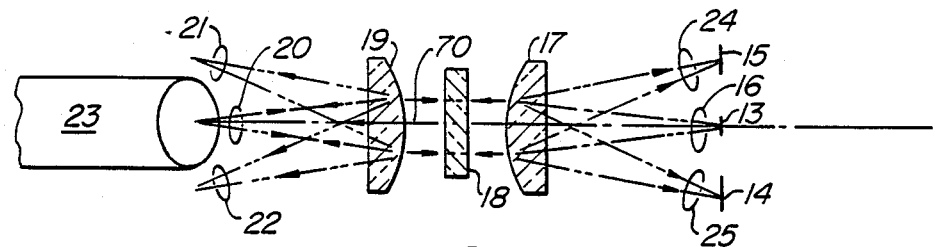
FIG._3.
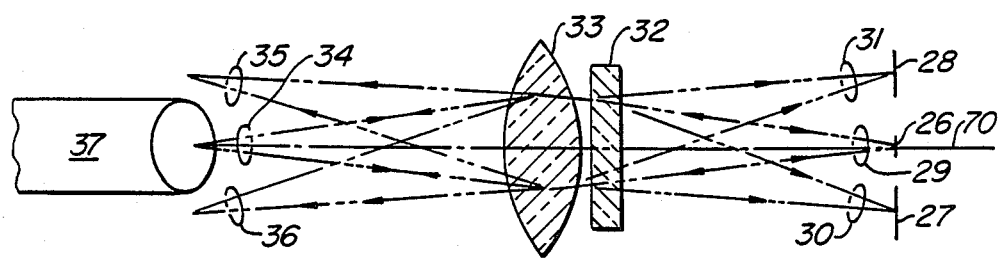
FIG._4.
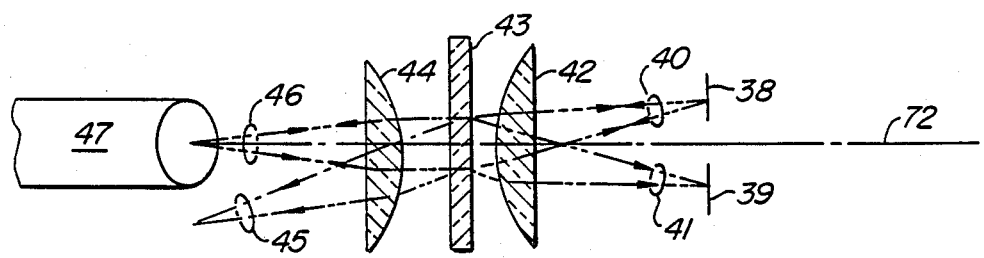
FIG._5.
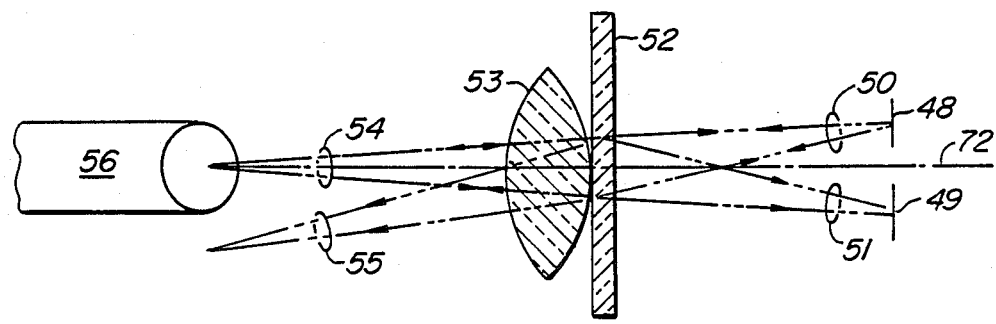
FIG._6.

INTEGRATED FIBER OPTICS TRANSMITTER/RECEIVER DEVICE

BACKGROUND

The present invention relates to fiber optics transmitters and receivers for use in two-way communication systems.

Information can be transmitted through cables via electrical current, microwaves or light waves. The bandwidth of the information which can be carried by modulating the electrical current is limited. Higher bandwidth data transmission can be provided by microwave propagation. Of course, the use of light waves provides the highest bandwidth, which can be into the gigahertz range.

Light wave communication can be done through space or through light pipes or a waveguide. For example, many of the remote control boxes for television sets use an infared beam to send a control signal to the television set. For voice, video or data communication, an optical fiber is used as a waveguide for the light wave. An optical fiber is made up of different mixtures of silicon dioxide material and typically has a diameter of approximately 100 micrometers. As a result, the optical cable is very light weight. In an optical communication system, light from a light source, such as a light emitting diode (LED) or laser diode, is coupled into the core of the optical fiber. Since the optical fiber is made up of low loss material, most of the light coupled into the optical fiber will emerge again on the other end of the fiber. A high speed photodetector can be used to pickup the information and convert it back into electrical signals. At present, most fiber optics communication systems are designed to use one fiber for transmitting information and one fiber for receiving information. The number of fibers bundled into a fiber cable is determined by the number of transmitters and receivers required at both destinations.

Because of the ever increasing volume of information to be communicated over large distances, there is an increasing need for using optical fiber as the channel for communication. In many offices today, microcomputers, minicomputers and mainframe computers are connected into a local area network. While coaxial cables are employed extensively for connections within a building, separated buildings are now linked together by coaxial cables or optical fibers. Although optical fibers can carry more information, the cost of optical fibers limits the wide spread use of fiber optics in networking applications.

FIG. 1(A) shows an optical fiber with a transmitter at one end of the fiber and a receiver at the other end. A light source 1, which is either a light emitting diode or a laser diode, emits a cone of light. A lens 2 is used to collect the light and image it to one end of an optical fiber 3. The amount of light coupled into the optical fiber is determined by the numerical aperture of lens 2 and the amount of divergence of the cone of the light source. Except for a small amount of light loss through scattering by the particulate matter inside the waveguide, most of the light is transmitted through the fiber and focused by a lens 4 to a detector 5. The light loss through the fiber is a strong function of the wavelength of the light. For wavelengths in the near infared region from 780 nm to 850 nm, the rate of light loss is about 2 db/Kilometer. The loss is even lower at 1300 nm wavelength. Hence, information can be communicated over a few tens of kilometers without the need of a repeater. FIG. 1(B) shows a pair of optical fibers for a two-way communication system.

FIG. 2 shows another two-way communication system using a single optical fiber. A laser diode 6 emits a diverging light beam which is collimated or made parallel by a collimating lens 7. A second lens 8 is used to focus the collimated beam into a small light spot in order to couple the laser light into an optical fiber 12. A beam-splitter 9 is interposed between the lenses 7 and 8 to reflect a portion of the light coming out from the end of the fiber. This portion of the returned light is focused by lens 10 into a detector 11. An identical system is also implemented on the other end of the optical fiber. This two-way communication system eliminates the need for using two optical fibers. However, the alignment of the optical components to couple light into and out of the optical fiber becomes not only more critical, but also more sensitive to mechanical vibration and other environmental changes.

The amount of information carried by a single optical fiber can be increased by time multiplexing the signals or frequency multiplexing the signals. When the signals are frequency multiplexed, two or more different wavelength light beams are used. This requires an optical apparatus at the receiving end to separate the two beams, or demultiplex them. Some systems use diffraction gratings created by holographic methods to diffract a beam of one wavelength while allowing the beam of the other wavelength to continue on its original path. Such demultiplexers or multiplexers are shown, for instance, in U.S. Pat. Nos. 3,666,345; 4,198,117; 4,359,259; 4,362,359; 4,387,955; and 4,626,069. Hologram lenses are also used in coupler devices which serve a repeater function in a fiber optic cable. Examples are shown in U.S. Pat. Nos. 3,975,082; 4,057,319; and 4,465,332.

The objective of this invention is to disclose an optical transmitter/receiver device which can provide two-way communication through a single fiber without the disadvantages of the prior art systems.

SUMMARY OF THE INVENTION

The present invention is an integrated transmitter/receiver system which uses a hybrid component for both the light source and the light detector, with holographic optical elements for dividing the light beam into two or more beams. The hybrid component contains a laser diode and a detector mounted on the same mechanical structure. This invention allows the placement of all the components substantially along a single optical axis. This arrangement reduces alignment problems and vibrational errors.

In the first embodiment, the laser beam emitted by the laser diode is collimated by a first lens and then focused to the end of the optical fiber by another lens. A holographic beam-splitter is placed between the two lenses. In a second embodiment, a single lens is employed to image the laser diode beam onto the fiber and image the beam from the fiber onto the detector. The holographic beam-splitter is placed between the imaging lens and the laser diode/photodetector. In the first and second embodiments, the laser diode is positioned along the optical axis of the lenses. The detector is about 1 mm off the optical axis, positioned to receive the 1st order diffracted beam.

In a third and fourth embodiment, the laser diode and the detector are symmetrically placed about the optical axis of the lens. The holographic beamsplitter is fabricated to produce two diffracted beams, with the 0 order beam suppressed. This allows better utilization of the light emitted by the laser diode. The holographic beamsplitter is a transmissive element. Slight angular rotation and displacement of the component will not affect the relationships between the light source with respect to the fiber or the fiber with respect to the detector.

The present invention thus provides a simple optical head with less parts than the prior art, which is easier to align and less sensitive to environmental changes.

For a fuller understanding of the nature and advantages of the invention, reference should be made to the ensuing detailed description taken in conjunction with the accompanying drawings.

BRIEF DESCRIPTION OF DRAWINGS

FIGS. 1(A) and 1(B) are diagrams of a prior art duplex transmitter/receiver system.

FIG. 2 is a diagram of a prior art two-way communication system through a single optical fiber.

FIG. 3 is a diagram of a first preferred embodiment of the present invention.

FIG. 4 is a diagram of a second preferred embodiment of the present invention.

FIG. 5 is a diagram of a third preferred embodiment of the present invention.

FIG. 6 is a diagram of a fourth preferred embodiment of the present invention.

DETAILED DESCRIPTION OF THE PREFERRED EMBODIMENTS

A first embodiment of the transmitter/receiver device according to the present invention is shown in FIG. 3. A semiconductor laser diode 13 is mounted on the same supporting structures with a pair of photodetectors 14 and 15. Laser diode 13 emits a cone of light 16 which is collimated by a lens 17 to produce a collimated beam. A holographic beam-splitter 18 is used to diffract the collimated beam into three beams identified as 20, 21 and 22 in FIG. 3. Beam 20 is focused into the end of an optical fiber 23 for the transmission of information to the other end of the optical fiber. Beams 21 and 22 are not utilized.

In using the device for receiving information, the beam emerging from optical fiber 23 is again labeled as beam 20. This beam, after passing through lens 19, is diffracted by holographic beam-splitter 18 into a beam with the same path as beam 16, 24 and 25. Beams 24 and 25 are intercepted by photodetectors 14 and 15 to convert the information encoded in the fluctuation of the light wave back into electrical signals.

Because detectors 14 and 15 are at a very short distance from laser diode 13, the light emitted by laser diode 13 is also detected by detectors 14 and 15. There are two methods for distinguishing the received signal from the transmitted signal at the detector output. One is to encode the signals at different center frequencies. With this scheme, a simple bandpass filter in the electronics will isolate the received signal from the transmitted signal. Therefore, signals can be transmitted from both ends of the optical fiber at the same time.

Another method is more commonly used in local area networks. This method relies on transmitting when no one else is transmitting. Suppose that both transmitters are sending messages simultaneously. Then the increase in signal level at the detector indicates that there is a signal collision, and thus two sources transmitting at the same time. The system automatically stops transmission at both ends and gives permission to one of the transmitters to operate while the other transmitter waits for its turn. This embodiment has the advantage that collimating lens 16 can be selected to collect a significant portion of the light emitted by the laser diode, since it is tuned to a single wavelength. For example, 60–70 percent of the light from the laser diode can be collected by a lens with a numerical aperture of 0.30. The holographic beam-splitter typically can focus 50 percent of the incident beam into beam 20 for transmitting data. On the other hand, about 15–20 percent of the light coming out from the optical fiber is focused to each of detectors 14 and 15 to give a total signal detection efficiency of about 30–40 percent.

The second embodiment of the present invention is shown in FIG. 4. In this embodiment, a laser diode 26 produces a laser beam which is imaged by a lens 33 to the end of an optical fiber 37. From a single diverging beam 29 from the laser diode, the holographic beamsplitter subdivides the beams into beams 34, 35 and 36. Beam 34 is arranged to converge on the end of optical fiber 37. The incoming beam from fiber 37 is diffracted by the holographic beam-splitter into beams 29, 30 and 31. The beams 30 and 31 are intercepted by detectors 27 and 28 for signal detection.

In the embodiments shown in FIG. 3 and FIG. 4, the laser diodes are located along an optical axis 70 of the lenses. The detectors are placed at a small distance, typically about 1 mm, from the optical axis.

In the embodiments shown in FIG. 5 and FIG. 6, both the laser diode and the detector are arranged symmetrically about an optical axis 72. This configuration eliminates one detector from the transmitter/receiver device. In FIG. 5 a laser diode 38 emits a diverging beam 40 which is collimated by a lens 42. Due to the fact that the laser diode is off axis, the collimated beam propagates at an angle. A holographic beam-splitter 43 is designed to correct the tilt in the collimated beam so that a beam 44 is focused to a fiber 47 located along the optical axis 72 of the lenses. The other diffracted beam 45 from the beam-splitter is focused outside the fiber. A beam 46 exiting from the optical fiber is collimated by lens 44. The holographic beam-splitter divides this beam symmetrically about the optical axis. One beam is imaged to the detector 39 and the other beam is imaged to the face of the laser diode. This particular beam-splitter is different from the previous holographic beam-splitter of FIGS. 3 and 4 in that it has one $+1$ and $-1$ diffracted orders. The 0 order beam is suppressed by controlling the profile of the holographic beam-splitter according to known techniques. The holographic beam-splitter has a diffraction efficiency of 40 percent at each of the detectors.

FIG. 6 is another embodiment having an off-axis laser diode and detector. In this embodiment, a single imaging lens 53 is employed instead of the two collimating lenses in FIG. 5. The laser beam from laser diode 48 is divided by a holographic beam-splitter 52 into focused beams 54 and 55. Both beams are focused to a plane containing the end of an optical fiber 56. Beam 54 is coupled into optical fiber 56. When the device is used as a receiver, the beam from the optical fiber is divided into beams 50 and 51. Beam 51 is intercepted by a detector 49.

With the laser diode and the detector package in the same structure and the use of a holographic beam-splitter, the transmitter/receiver device can be built into a highly integrated and compact device. Since the holographic beam-splitter is a transmissive element, small angular or translational changes of the holographic beam-splitter do not misalign the laser beam with respect to the optical fiber. This results in a highly reliable two-way communication device for fiber optics communication applications.

As will be understood by those familiar with the art, the present invention may be embodied in other specific forms without departing from the spirit or essential characteristics thereof. For example, the single lens of FIGS. 4 and 6 could be placed on the other side of the holographic element. Accordingly, the disclosure of the preferred embodiments of the invention is intended to be illustrative, but not limiting, of the scope of the invention which is set forth in the following claims.

What is claimed is:

1. A transmitter/receiver for coupling to an end of a fiber optic cable, comprising:
   a laser beam source for generating a source laser beam;
   at least one photodetector;
   a diffraction grating disposed between said laser beam source and said fiber optic cable for diffracting a beam from said end of said fiber optic cable to cause a diffracted beam to hit said photodetector; and
   lens means for converging said source laser beam onto said end of said fiber optic cable and converging said diffracted beam onto said photodetector.

2. The apparatus of claim 1 further comprising a second photodetector for receiving a second diffracted beam from said diffraction grating, said first-mentioned and second photodetectors being mounted on opposing sides of said laser beam source.

3. The apparatus of claim 1 wherein said laser beam source is mounted at an angle to an optical axis through said lens means, said diffraction grating and said end of said fiber optic cable, said photodetector being mounted at an identical angle to said optical axis on an opposite side from said laser beam source.

4. The apparatus of claims 2 or 3 wherein said lens means is a single lens.

5. The apparatus of claims 2 or 3 wherein said lens means comprises first and second collimating lenses, said first lens being positioned between said laser beam source and said diffraction grating, and said second collimating lens being positioned between said diffraction grating and said fiber optic cable.

6. The apparatus of claims 2 or 3 wherein said laser beam source comprises a laser diode.

7. The apparatus of claims 2 or 3 wherein said diffraction grating is a holographic diffraction grating.

8. The apparatus of claims 2 or 3 wherein said diffracted beam is a first order diffracted beam.

9. The apparatus of claim 3 wherein said diffraction grating is constructed to suppress a 0 order diffraction beam.

10. A transmitter/receiver for coupling to an end of a fiber optic cable, comprising:
    a laser beam source for generating a source laser beam;
    a first photodetector located on a first side of said laser beam source;
    a second photodetector mounted on an opposing side of said laser beam source from said first photodetector;
    a holographic diffraction grating disposed between said laser beam source and the fiber optic cable for diffracting a beam from said end of said fiber optic cable to cause a first 1st order diffraction beam to hit said first photodetector and a second 1st order diffraction beam to hit said second photodetector; and
    lens means for converging said source laser beam onto said end of said fiber optic cable and converging said diffracted beams onto said photodetectors.

11. A transmitter/receiver for coupling to an end of a fiber optic cable, comprising:
    a laser beam source for generating a source laser beam;
    a photodetector;
    a holographic diffraction grating disposed between said laser beam source and said fiber optic cable for diffracting a beam from said end of said fiber optic cable to cause a first order diffraction beam to hit said photodetector, said holographic diffraction grating being constructed to suppress a 0 order beam;
    lens means for converging said source laser beam onto said end of said fiber optic cable and converging said diffracted beam onto said photodetector; and
    said laser beam source and said photodetector being mounted at identical angles to an optical axis through said lens means, said diffraction grating and said end of said fiber optic cable.

12. A transmitter/receiver for coupling to an end of a fiber optic cable, comprising:
    a laser beam source for generating a source laser beam along a single optical axis;
    first and second photodetectors placed along substantially the same single optical axis on which the laser beam source is located in substantially the same plane as said laser beam sources on opposite sides of said laser beam source;
    a diffraction grating disposed between said laser beam source and the fiber optic cable for diffracting a beam from said end of said fiber optic cable to cause diffracted beams to hit said photodetectors; and
    lens means for converging said source laser beam onto said end of said fiber optic cable and converging said diffracted beams onto said photodetectors.

13. The apparatus of claim 12 wherein the laser beam source is positioned along the optical axis and the photodetectors are approximately 1 mm from said laser beam source off the optical axis.

* * * * *